United States Patent [19]

Kamatani et al.

[11] Patent Number: 4,546,153

[45] Date of Patent: Oct. 8, 1985

[54] METHOD FOR CURING POLYURETHANE COMPOUNDS

[75] Inventors: Yoshio Kamatani, Osaka; Takurou Sakamoto, Kawanishi, both of Japan

[73] Assignee: Takeda Chemical Industries, Ltd., Osaka, Japan

[21] Appl. No.: 672,190

[22] Filed: Nov. 16, 1984

[30] Foreign Application Priority Data

Nov. 25, 1983 [JP] Japan ................................ 58-222826

[51] Int. Cl.$^4$ .............................................. C08G 18/38
[52] U.S. Cl. ..................................... 525/453; 525/460; 528/73; 528/369; 528/405
[58] Field of Search ................... 525/453, 460; 528/73, 528/369, 405

[56] References Cited

U.S. PATENT DOCUMENTS

| 3,730,953 | 5/1973 | Naito et al. | 521/159 |
| 3,874,898 | 4/1975 | McInnes et al. | 117/62 |
| 4,408,034 | 10/1983 | Kazama et al. | 528/54 |
| 4,443,590 | 4/1984 | Kamatani et al. | 528/51 |
| 4,443,597 | 4/1984 | Kamatani et al. | 544/67 |
| 4,456,744 | 1/1984 | Kamatani et al. | 528/71 |

Primary Examiner—Maurice J. Welsh
Attorney, Agent, or Firm—Antonelli, Terry & Wands

[57] ABSTRACT

Polyurethane compound is cured in a short time at about room temperature by contacting a polyurethane compound having 1-oxa-3,5-diazine-2,4,6-trione ring but no isocyanate group with an amine present in gaseous phase in the presence or absence of such a compound having active hydrogen as polyester polyol. A one-package type urethane resin composition curable at low temperature is made available.

30 Claims, No Drawings

METHOD FOR CURING POLYURETHANE COMPOUNDS

This invention relates to a method for curing a polyurethane compound having 1-oxa-3,5-diazine-2,4,6-trione ring and having no isocyanate group.

It is an object of this invention to provide a method for curing a compound having 1-oxa-3,5-diazine-2,4,6-trione ring and having no isocyanate group in a short time at about room temperature.

In general, urethane resins are widely used as coating materials, printing inks, adhesives, etc. because of their excellent toughness, chemical resistance, adhesion, and gloss and urethane resin components employed for such uses may ordinarily be classified into one-pachage type and two-package type. The former comprises a compound having at least two isocyanate groups in one molecule and having a molecular weight of 500 to 10,000. When this compound is applied to a substrate, the isocyanate group reacts with water, for example, in the air to cause curing. In the latter case, a main component comprising a polyol having at least two hydroxyl groups in one molecule and a curing agent comprising a polyisocyanate having at least two isocyanate groups in one molecule, which are mixed at a specific ratio, are applied to a substrate and curing occurs due to the reaction of the isocyanate group and the hydroxyl group.

Apart from the curing reaction due to the action of isocyanate group as mentioned above, the inventors have paid attention to the curing reaction due to ring opening of 1-oxa-3,5-diazine-2,4,6-trione ring and have made intensive researches on utilization of this reaction for a long time. 1-Oxa-3,5-diazine-2,4,6-trione ring is common with isocyanate group in having reactivity with active hydrogen and besides is much superior in storage stability. However, the ring is inferior to isocyanate group in reactivity with active hydrogen and heating is required to allow the reaction of the ring with isocyanate group to proceed. When a specific catalyst is used, the reaction can proceed even at room temperature, but a considerably long time is required to complete the curing.

The inventors chose polyurethane compounds having 1-oxa-3,5-diazine-2,4,6-trione ring which are much superior in stability to the hitherto used one-package type or two-package type urethane resin compositions containing a component having terminal isocyanate group and they made researches on methods for curing said polyurethane compounds at low temperatures and in a short time. As a result, this invention has been attained. A one-package type composition which cures at low temperatures has been made available, for the first time, according to this invention. It has further been found that the polyurethane resins such as coating materials thus obtained by curing at low-temperatures have excellent properties.

That is, this invention relates to a method for curing a polyurethane compound which comprises contacting a polyurethane compound having 1-oxa-3,5-diazine-2,4,6-trione ring and having no isocyanate group with an amine present in gaseous phase in the presence or absence of a compound having active hydrogen.

The polyurethane compound having 1-oxa-3,5-diazine-2,4,6-trione ring (which is occasionally abbreviated to merely "trione ring" hereinafter) and having no isocyanate group will be explained below.

The compound may be produced, for example, by reacting an aliphatic, alicyclic or aralkyl polyisocyanate with carbon dioxide to produce a compound having trione ring and isocyanate group and then reacting this compound with a compound having active hydrogen.

As examples of the aliphatic, alicyclic or aralkyl polyisocyanate, mention may be made of di- or triisocyanate, such as tetramethylene diisocyanate, hexamethylene diisocyanate, $\omega,\omega'$-diisocyanatodipropyl ether, 2,6-diisocyanatocaproate, 1,6,11-triisocyanatoundecane, bis(isocyanatomethyl)cyclohexane, bis(isocyanatoethyl)cyclohexane, 1-isocyanato-3-isocyanatomethyl-3,5,5-trimethylcyclohexane, bis(4-isocyanatocyclohexyl)methane, xylylene diisocyanate, bis(2-isocyanatoethyl)benzene, etc. and dimer or trimer thereof. The polyisocyanate may be used alone or as mixtures thereof and furthermore may be used in admixture with monoisocyanate, such as methyl isocyanate, ethyl isocyanate, n-butyl isocyanate, $\omega$-chlorohexyl isocyanate, cyclohexyl isocyanate, cyclohexylmethyl isocyanate, benzyl isocyanate, phenylethyl isocyanate, etc. The reaction of isocyanate with carbon dioxide can be carried out, for example, by blowing carbon dioxide into the isocyanate in the presence of a catalyst. As the catalyst, tertiary phosphine, arsenic compound and hydroquinone may be used and the tertiary phosphine is especially effective. Ordinarily, reaction temperature is about $-10°$ C. to about 100° C. and reaction time is about 1 to 20 hours. Various compounds are generally added to terminate the reaction and to stably preserve the products. Such reaction terminators and stabilizers include alkylating agents, acylating agents, acids, ester derivatives, phenols, peroxides, sulfur, polysulfides, metal sulfides, halogens, etc.

This reaction affords compounds having turione ring and isocyanate group, but the reaction mixture contains unreacted isocyanate monomers and other low functional substances. These unreacted isocyanate and the like in the reaction mixture may be removed by common means such as distillation and extraction, but without removing these isocyanate and other substances the reaction mixture may be, as it is, supplied to the subsequent reaction with a compound having active hydrogen. Thus obtained compounds having trione ring and isocyanate group are usually of 2 to 5, mainly 3 to 4 in average functionality which is the sum of trione ring and isocyanate group in one molecule.

Of these compounds having trione ring and isocyanate group those which are derived from aliphatic diisocyante, e.g., hexamethylene diisocyanate, or alicyclic diisocyanate, e.g., bis(isocyanatomethyl)cyclohexane with carbon dioxide, are excellent in curability and properties of resins obtained after curing.

Compounds having trione ring and having no isocyanate group can be obtained by subsequent reaction of said compound having trione ring and isocyanate group with a compound having active hydrogen. As the compounds having active hydrogen, those of the following (i), (ii) and (iii) may be mentioned.

(i) Compound containing at least two active hydrogens and having a molecular weight of 200 to 50,000, more preferably polyol having 2 to 50 hydroxyl groups in one molecule and having a molecular weight of 200 to 50,000.

They may be compounds containing carboxyl group, amino group, thiol group, etc. which have active hydrogen, in place of the hydroxyl group. In more detail, there may be suitably used polyester polyol, polyether polyol, polyether-ester polyol, polyester-amide polyol, acrylic polyol, polyurethane polyol, epoxy polyol, epoxy-modified polyol, polyhydroxyalkane, oil-modified polyol, castor oil or mixtures thereof.

Examples of said polyester polyol are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyol obtained by ring opening polymerization of lactones such as caprolactone, methylcaprolactone, etc. with glycols, etc.

Examples of the polyether polyol are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture or alternately to reactive hydrogen atom-containing initiators. As the reactive hydrogen atom-containing initiators, mention may be made of water, polyol, such as ethylene glycol, propylene glycol, glycerol, trimethylolpropane, pentaerythritol, sorbitol, etc., amino alcohols such as ethanol amine, polyamine, such as ethylenediamine, etc.

As examples of the polyether-ester polyol, mention may be made of those which are obtained by subjecting said polyether polyol and polybasic acid to polyesterification reaction and besides those which have both the segments of polyether and polyester in one molecule and which are obtained by ring-opening copolymerization of epoxide compounds and acid anhydrides.

Examples of the polyester-amide polyol are those which are obtained by said polyesterification reaction where amino group-containing starting materials such as ethylenediamine, propylenediamine, hexamethylenediamine, xylylenediamine, hydrogenated xylylenediamine, ethanolamine, propanolamine, etc. are additionally used.

The acrylic polyol can be prepared by copolymerizing polymerizable monomers containing at least one hydroxyl group in one molecule with other monomers copolymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleate and fumarate, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above and vinyl monomers such as styrene, α-methylstyrene, vinyl acetate, acrylonitrile, methacrylonitrile, etc.

As examples of polyurethane polyol, mention may be made of reaction products of polyol and polyisocyanate which have terminal hydroxyl group. Examples of the polyol are polyol, such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyol, such as polyester polyol, polyether polyol, polyester ether polyol, polyester amide polyol, etc. As the polyisocyanate, mention may be made of tetramethylene diisocyanate, hexamethylene diisocyanate, 2,6-diisocyanatomethyl-caproate, 3-isocyanatomethyl-3,5,5-trimethylcyclohexyl isocyanate, 4,4'-methylenebis(cyclo-hexyl isocyanate), 1,3- or 1,4-bis-(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of the polyisocyanate. Furthermore, reaction products of said polyisocyanate with said polyol a part of which is substituted with an amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyol.

As the epoxy polyol, there may be used condensation type epoxy resin obtained by reacting a polyphenol compound or its nuclear hydrogenated product with epichlorohydrin. Furthermore, epoxy ester resin obtained by reacting a fatty acid with an epoxy resin and modified epoxy resin obtained by reacting an alkanol amine with an epoxy resin may also be used.

Examples of the polyhydroxyalkane are hydrolyzed products of vinyl acetate homopolymers or copolymers of vinyl acetate with other ethylenic copolymerizable monomer and polybutadiene polyol.

When the method of this invention is applied to the solventless type resins, of said polyol components, compounds having functionality of 2 to 6, preferably 2 to 4 and having a mean molecular weight of at least 10,000, preferably 200 to 5,000 are used.

(ii) Besides the compound having active hydrogen of relatively high molecular weight as mentioned hereinabove, low molecular weight polyol and polyamine having molecular weight of about 60 to 200 may also be used.

Examples of the low molecular weight polyol are ethylene glycol, propylene glycol, butylene glycol, hexylene glycol, neopentyl glycol, cyclohexanedimethanol, glycerol, trimethylol propane, pentaerythritol, diethylene glycol, triethylene glycol, dipropylene glycol, etc.

Examples of the low molecular weight polyamine are aliphatic polyamine, such as ethylenediamine, propylenediamine, trimethylenediamine, diethylenetriamine, tetramethylenediamine, hexamethylenediamine, N,N'-dibutylhexamethylenediamine, etc., aromatic polyamide such as tolylenediamine, phenylenediamine, 4,4'-diaminodiphenylmethane, 4,4'-methylenebisorthochloroaniline, 1,2,4-triaminobenzene, etc., alicyclic polyamide such as piperazine, cyclohexylenediamine, isophoronediamine, dipiperidine, 1,3-di(4-piperidyl)-propane, etc., aralkyl polyamine such as xylylenediamine, etc., hydrazine, etc.

(iii) Furthermore, monoalcohol such as methanol, ethanol, propanol, butanol, octanol, benzyl alcohol, cyclohexanol, 2-ethoxyethanol, etc. and secondary amine such as dimethylamine, dicyclohexylamine, etc. may be used.

The components (i) and (ii) may be used alone, respectively, but two or more of the components (i), (ii) and (iii) may also be used in combination. For instance, a combination of the components (i), (ii) and (iii), a combination of the components (i) and (ii) or a combination of the components (i) and (iii) may be usable, the combinations (i) and (iii) being preferable.

The reaction of the compound having trione ring and isocyanate group with the compound (i), (ii) or (iii) having active hydrogen is carried out at such a ratio as the number of active hydrogen ≧ the number of NCO under the ordinary reaction conditions for formation of urethane using known catalysts for formation of urethane such as organic compounds and organic acid salts of tin.

Thus, there is obtained polyurethane compound having trione ring and no isocyanate group in the molecule. The polyurethane compound may contain functional group such as hydroxyl group (referred to as "hydroxyl group" hereinafter) having active hydrogen, in addition to functional group of trione rine.

Furthermore, as method for producing the polyurethane compound having trione ring and having no isocyanate group, mention may also be made of one which comprises reacting said isocyanate with the compound having active hydrogen to produce a polyurethane prepolymer having isocyanate group and leading this free isocyanate group to the trione ring. Moreover, this method may be combined with the method mentioned hereinbefore. Proper method may be employed depending on the purpose.

The compound usable in this invention which has trione ring and has no isocyanate group has an average functionality of 2 to 10, preferably 2 to 5, which is the sum of the number of trione ring and active hydrogen is one molecule.

The polyurethane compound having trione ring and having no isocyanate group is allowed to contact with an amine present in gaseous phase in the presence or absence of a compound having active hydrogen.

The compound having active hydrogen include those of the above mentioned (i), (ii) and (iii), particularly (i) or mixture thereof. When the polyurethane compound having trione ring and having no isocyanate group has hydroxyl group, the compound having active hydrogen may not necessarily be present.

The proportion of trione ring to active hydrogen before curing by contacting with an amine present in gaseous phase is adjusted so that the ratio of the number of the trione ring to that of the active hydrogen is within the range of 0.1 to 10, preferably 0.3 to 3, more preferably 0.8 to 1.2. The number of active hydrogen means the sum of the number of active hydrogen in the compound having trione ring and the number of active hydrogen in the compound having active hydrogen. When the amine per se has active hydrogen, the number of active hydrogen in the amine transferred from gaseous phase into resins should also be included.

The amine usable in the method of this invention includes aliphatic or aromatic tertiary amine. As examples of aliphatic tertiary amine, mention may be made of chain aliphatic monoamine such as trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, etc., chain aliphatic di- or tri-amine such as N-tetramethylethylenediamine, N-tetramethylhexane-1,6-diamine, N-pentamethyldiethylenetriamine, bis(2-dimethylaminoethoxy)-methane, N,N,N'-trimethyl-N'-(2-hydroxyethyl)ethylenediamine, N,N-dimethyl-N',N'-(2-hydroxyethyl)ethylenediamine, tetramethylguanidine, etc., and cycloaliphatic mono-, di- or triamine such as N-methylpiperidine, N-ethylpiperidine, N-methylmorpholine, N-ethylmorpholine, 1,4-dimethylpiperidine, 1,2,4-trimethylpiperadine, N-(2-dimethylaminoethyl)morpholine, 1-methyl-4-(2-dimethylamino)piperidine, 1,4-diazabicyclo[2,2,2]octane, 2-methyl-1,4-azabicyclo[2,2,2]octane, quinuclidine, 1,5-diazabicyclo[5,4,0]-5-undecene, 1,5-diazabicyclo[4,3,0]-5-nonene, etc. As aromatic tertiary amine, mention may be made of dimethylaniline, diethylaniline, dimethylbenzylamine, pyridine, picoline, quinoline, etc.

As further amine usable in this invention, mention may be made of ammonia or an aliphatic primary or secondary amine such as ethylamine, propylamine, butylamine, octylamine, cyclohexylamine, benzylamine, diethylamine, dibutylamine, dicyclohexylamine, dibenzylamine, piperidine, N-methylpiperazine, morpholine, etc. and an aromatic primary or secondary amine such as aniline, N-methylaniline, naphthylamine, etc. The amine has active hydrogen in the molecule and hence said compound having active hydrogen may not necessarily coexist.

Concentration of the amine present in gaseous phase may be within the range of about 10 to about 100,000 ppm, more preferably about 100 to about 20,000 ppm. The contacting temperature may vary within the range of about 0° to about 100° C., preferably about 10° to about 50° C., and usually about room temperature suffices. The contacting time may vary depending on composition of resin, temperature, thickness of film, kind and concentration of the amine and is generally about 1 to about 10 minutes.

The amine present in gaseous phase includes not only one present as vapor phase, but one dispersed or floated as fine particles in other gaseous phases. For example, it may be present in the form of spray, aerosol, mist, etc. Moreover, the amine may be present as fine particles in the form of dissolved in or carried by other substance. That is, it may be used in the form suitable for purposes. As gaseous substance other than the amine, air is ordinarily used, but other gaseous substances such as nitrogen, etc. which do not damage the activity of the amine may be used.

According to the method of this invention, generally a polyurethane compound having trione ring and having no isocyanate group or a mixture of this polyurethane compound with a compound having active hydrogen is coated on a substrate and allowed to contact with an amine present in gaseous phase. In this case, they may be coated without solvents, but may also be dissolved in or diluted with organic solvents.

These organic solvents include, for example, toluene, xylene, ethyl acetate, butyl acetate, cellosolve acetate, methyl ethyl ketone, methyl isobutyl ketone, cyclohexanone, etc. which are commonly used for urethane resins. Kinds and amounts of these organic solvents may be properly determined depending on the purpose. When solvents are used, it is preferred in many cases to select those which accelerate permeation speed of the amine.

The polyurethane compound having trione ring and having no isocyanate group is excellent in storage stability in both the cases when said compound per se has hydroxyl group and when compound having active nitrogen is present with the polyurethane compound. Therefore, the polyurethane compound of this invention can be stably stored as one-package type resin composition. If necessary, to these compositions may be added alkylating agents, acylating agents, acids, ester derivatives, nitriles, phenols, etc. such as dimethyl sulfate, methyl iodide, toluenesulfonic acid, benzoyl chloride, ethyl chloroformate, phosphorus trichloride, boron trifluoride etherate, pentachlorophenol, trichloroacetic acid, ethyl α-bromopropionate, ethyl cyanoacetate, malononitrile, picric acid, 2,4,6-trinitrobenzoic acid, etc. Addition of these additives provides compositions further improved in storage stability. Furthermore, addition of tertiary amine, tertiary phosphine or weak acid salt, hydroxide or alcoholate of quaternary ammonium, alkali metal or alkaline earth metal which promotes reaction of trione ring makes it possible to sufficiently perform not only the reaction of the surface portion of the coating, but also that of the inside of the coating when this is contacted with amine.

Furthermore, if necessary, to the polyurethane compound having trione ring and having no isocyanate group or compound having active hydrogen or mixtures thereof may be added various additives such as pigments, dyes, leveling agents, antifoamers, anti-sag agents, fillers, plasticizers, antioxidants, ultraviolet absorbers, tackifiers, etc.

The method of this invention is applicable to various fields such as coating materials, printing inks, adhesives, films, etc., where urethane resins are put to practical use. When the mixture is coated on a substrate and cured, woods, metals such as iron and aluminum, plastics, rubbers, papers, tiles, concretes, slates, various boards, composite materials, etc. may be used as the substrate.

According to the method of this invention, the polyurethane compound having trione ring and having no isocyanate group is excellent in storage stability and can be cured and dried in a short time even at about room temperature. Therefore, the method of this invention can be advantageously employed in the fields such as line coating, pinting, bonding and film forming processes where coating is continuously carried out and curing and drying are accomplished in a short time. The cured and dried film is of non-yellowing property and so can also be used for outer uses which require especially weather resistance.

The following examples will further illustrate this invention.

REFERENCE EXAMPLE 1

To 841 g of hexamethylene diisocyanate was added 1.8 g of tri-n-butylphosphine while introducing carbon dioxide thereinto at 40° C. and the reaction was carried out for 6 hours while stirring. Feeding of carbon dioxide was discontinued and 0.3 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazine trione ring content of 2.77 meq/g, a residual monomer content of 0.4% and a viscosity (Gardner) of Y-Z (2,000 cps) at 25° C.

REFERENCE EXAMPLE 2

To 971 g of 1,3-bis(isocyanatomethyl)cyclohexane was added 2.1 g of tri-n-butylphosphine while introducing carbon dioxide at 0° C. and the reaction was carried out for 7 hours while stirring. Feeding of carbon dioxide was replaced by nitrogen and 2.7 g of benzoyl peroxide was added and stirring was carried out for 30 minutes. Starting materials were removed from the product with a film evaporator to obtain 165 g of viscous liquid of pale yellow. This product had 4.40 meq/g in NCO content, 2.18 meq/g in oxadiazine trione content and 0.5% in residual monomer content.

REFERENCE EXAMPLE 3

To 1010 g of hexamethylene diisocyanate was added 7.5 g of tri-n-butylphosphine while introducing 800 ml/Hr of carbon dioxide thereinto at 20° C. and the reaction was carried out for 9 hours while stirring. Feeding of carbon dioxide was discontinued and while introducing nitrogen thereinto 4.5 g of 80% t-butylhydroperoxide was added and stirring was effected for 30 minutes. Starting materials were removed therefrom with a film evaporator to obtain 924 g of a viscous liquid of pale yellow. This product had an NCO content of 3.30 meq/g, oxadiazine trione content of 3.28 meq/g and a residual monomer content of 0.8%.

EXAMPLE 1

50 g of a polyester diol (OH value: 224 synthesized from phthalic anhydride and diethylene glycol was dissolved in 40 g of cellosolve acetate and 40 g of butyl acetate. To the resultant solution were added 26.5 g of polyisocyanate having trione ring which was obtained in Reference Example 1, 15 mg of dibutyltin dilaurate and 10 mg of ethyl chloroformate and reaction was effected at 60° to 70° C. for 3 hours while stirring. Judging from infrared absorption spectrum of the product, NCO reacted nearly completely, polyurethane prepolymer having hydroxyl group was produced and trione ring remained unreacted. The similar reaction was carried out using 30.4 g of the polyisocyanate obtained in Reference Example 2 in place of the polyisocyanate obtained in Reference Example 1 to obtain a solution of polyurethane prepolymer having hydroxyl group. These polyurethane prepolymer solutions were diluted with a mixed solvent of ethyl acetate and butyl acetate and each of the diluted solutions was spray coated on a cold rolled plate at a film thickness of about 40μ. The coated plates were left to stand in the air conditioning 10 mg/l of tetramethylethylene diamine vapor at room temperature for 10 minutes resulting in drying and curing of the films. The same samples which were left to stand in the air containing no amine for 10 minutes had tackiness and did not cure. The prepolymer solutions were stable without gelling at room temperature for more than 3 months. Properties of the amine-treated films which were left to stand for one day at room temperature are shown in Table 1.

TABLE 1

| Polyisocyanate | Polyisocyanate obtained in Reference Example 1 | Polyisocyanate obtained in Reference Example 2 |
| --- | --- | --- |
| Pencil hardness | B | HB |
| Crosscut test | 100/100 | 98/100 |
| Erichsen (mm) | 8 | 8 |
| Impact strength (DuPont test, ½") | 1000 × 50 | 1000 × 40 |
| Bending rest (mm) | 2 | 2 |
| Solvent resistance | | |
| Ethyl acetate | Δ- | |

TABLE 1-continued

| Polyisocyanate | Polyisocyanate obtained in Reference Example 1 | Polyisocyanate obtained in Reference Example 2 |
|---|---|---|
| Gasoline | | |

EXAMPLE 2

Twenty grams of polyisocyanate having trione ring which were obtained in Reference Example 3 was dissolved in 22 g of butyl acetate. To the solution were added 2.0 g of n-butanol and 20 mg of tin octylate and reaction was carried out at 60° C. for 3 hours while stirring. To the reaction product were added 42.8 g of polyester polyol: Takelac ® U-25 (OH value 137 and nonvolatile matter 75% and manufactured by Takeda Chemical Industries LTD.), 20 g of cellosolve acetate, 6 mg of dibutyltin dilaurate and 10 mg of benzoyl chloride and reaction was effected at 70° C. for 3 hours. The product was a polyurethane prepolymer having hydroxyl group in which NCO group was nearly lost and trione ring remained unreacted.

In the same manner as above except that 83.8 g of acrylic polyol: Acrylic ® A-851 (OH value 70 and nonvolatile matter 70% and manufactured by Dainippon Ink & Chemicals Inc.) was used in place of the polyester polyol and amount of the cellosolve acetate was 30 g, reaction was carried out for 5 hours to obtain a polyuretane prepolymer solution. These prepolymer solutions were diluted with ethyl acetate and spray-coated on cold rolled steel plates at a film thickness of about 30μ. These coated plates were left to stand in a cell through which the air containing 5 mg/l of N,N-bis(2-dimethylaminoethyl) methylamine was circulated at room temperature for 5 minutes to obtain dried and cured films. The same solutions were coated on sodium chloride optical crystals and subjected to the same amine treatment. After lapse of 30 minutes these were subjected to infrared absorption spectrum measurement to obtain residual trione ring contents of 25% and 12%, respectively. Properties of the films after lapse of one day are shown in Table 2.

TABLE 2

| Polyol component | Takelac ® U-25 | Acrylic ® A-851 |
|---|---|---|
| Pencil hardness | 2B | HB |
| Crosscut test | 100/100 | 95/100 |
| Erichsen (mm) | 8 | 6 |
| Impact strength (DuPont test, ½") | 1000 × 50 | 1000 × 30 |
| Bending rest (mm) | 2 | 2 |
| Chemical resistance | Δ– | |
| Ethyl acetate | | |
| Gasoline | | |

EXAMPLE 3

To 40 g of the polyisocyanate having trione ring which was obtained in Reference Example 1 were added 24 g of polypropylene glycol (OH value 280), 60 g of ethyl acetate and 20 mg of dibutyltin dilaurate and reaction was carried out at 70° C. for 2 hours while stirring, followed by adding 3.6 g of ethanol and reacting for 3 hours. In thus obtained polyurethane product, NCO group disappeared and trione ring remained. This was divided into two equal portions. To one portion were added 11 g of said polypropylene glycol and 40 mg of ethyl chloroformate and to another portion were added 13.5 g of polycaprolactone diol (OH value 230), 10 g of ethyl acetate and 50 mg of ethyl chloroformate. Each of the mixed liquid was coated on a glass plate by a film applicator and was left to stand in the air containing 20 mg/l of N,N-dimethylcyclohexylamine for 10 minutes. The films taken out had a slight tackiness, but when they were dried at 50° C. for 20 minutes, there were obtained nontacky films of about 20μ in thickness. Furthermore, said mixed solutions were stable without gelling for more than 3 months at 40° C.

EXAMPLE 4

The polyurethane product obtained in Example 3 and before mixed with polyol was diluted with an equal amount of ethyl acetate and coated on a steel plate by a brush. The plate was left to stand in the air in two 3 l desiccators which respectively contained 10 ml of ethylenediamine and 10 ml of 28% ammonia water for 3 minutes to obtain dried and cured films. They were not cured even after 7 days when they were left in the atmosphere.

We claim:
1. A method for curing a polyurethane compound which comprises contacting a polyurethane compound having 1-oxa-3,5-diazine-2,4,6-trione ring but no isocyanate group with an amine present in gaseous phase in the presence or absence of a compound having active hydrogen.
2. A method according to claim 1 wherein the polyurethane compound having 1-oxa-3,5-diazine-2,4,6-trione ring but no isocyanate group is a reaction product of a compound having trione ring and isocyanate group with a compound having active hydrogen.
3. A method according to claim 2 wherein the compound having trione ring and isocyanate group is a reaction product of an aliphatic, alicyclic or aralkyl polyisocyanate and carbon dioxide.
4. A method according to claim 3 wherein the aliphatic polyisocyanate is hexamethylene diisocyanate.
5. A method according to claim 3 wherein the alicyclic polyisocyanate is bis(isocyanatomethyl)cyclohexane.
6. A method according to claim wherein the compound having trione ring and isocyanate group has average functionality of 2 to 5.
7. A method according to claim 6 wherein the compound has average functionality of 3 to 4.
8. A method according to claim 2 wherein the compound having active hydrogen is one having at least two active hydrogens and a molecular weight of 200 to 50,000.
9. A method according to claim 8 wherein the compound having active hydrogen is polyol having 2 to 50 hydroxyl group in one molecule and a molecular weight of 200 to 50,000.
10. A method according to claim 9 wherein the compound having active hydrogen is polyester polyol, polyether glycol, polyether-ester polyol, polyester-amide polyol, acrylic polyol, polyurethane polyol, epoxy polyol, epoxy modified polyol, polyhydroxyalkane, oil modified polyol, castor oil or a mixture thereof.
11. A method according to claim 2 wherein the compound having active hydrogen is low molecular weight polyol or polyamine having molecular weight of 60 to 200.

12. A method according to claim 2 wherein the compound having active hydrogen is a monoalcohol or secondary amine.

13. A method according to claim 2 wherein the compound having active hydrogen is a combination of one having two active hydrogens and a molecular weight of 200 to 50,000 and a monoalcohol or secondary amine.

14. A method according to claim 2 wherein the reaction of the compound having trione ring and isocyanate group with the compund having active hydrogen is carried out at such a ratio as the number of active hydrogen ≧ the number of isocyanate group.

15. A method according to claim 1 wherein the compound having trione ring but no isocyanate group has active hydrogen-containing functional group in addition to trione ring.

16. A method according to claim 15 wherein the active hydrogen-containing functional group is hydroxyl group.

17. A method according to claim 1 wherein the compound having trione ring but no isocyanate group has an average functionality of 2 to 10, which is the sum of the number of trione ring and active hydrogen in one molecule.

18. A method according to claim 17 wherein the compound has an average functionality of 2 to 5.

19. A method according to claim 1 wherein the compound having active hydrogen is one having two hydrogens and a molecular weight of 200 to 50,000.

20. A method according to claim 1 wherein the compound having active hydrogen is low molecular weight polyol or polyamine having a molecular weight of about 60 to 200.

21. A method according to claim 1 wherein a proportion of trione ring to active hydrogen before curing by contacting with an amine present in gaseous phase is adjusted so that the ratio of the number of the trione ring and that of the active hydrogen is within the range of 0.1 to 10.

22. A method according to claim 21 wherein the proportion is 0.3 to 3.

23. A method according to claim 1 wherein the amine is aliphatic or aromatic tertiary amine.

24. A method according to claim 1 wherein the amine is ammonia, aliphatic primary or secondary amine, or aromatic primary or secondary amine.

25. A method according to claim 23 wherein the aliphatic tertiary amine is a chain aliphatic mono-, di- or tri-amine, or a cycloaliphatic mono-, di- or tri-amine.

26. A method according to claim 1 wherein concentration of the amine present in gaseous phase is within the range of 10 to 100,000 ppm.

27. A method according to claim 26 wherein the concentration of the amine is 100 to 20,000 ppm.

28. A method according to claim 1 wherein a contacting temperature with the amine is 0°–100° C.

29. A method according to claim 28 wherein the temperature is 10°–50° C.

30. A method according to claim 29 wherein the temperature is room temperature.

* * * * *